Nov. 21, 1961 L. M. LAYDEN 3,009,619
WIRE FEED MECHANISM
Filed Aug. 5, 1957 4 Sheets-Sheet 1
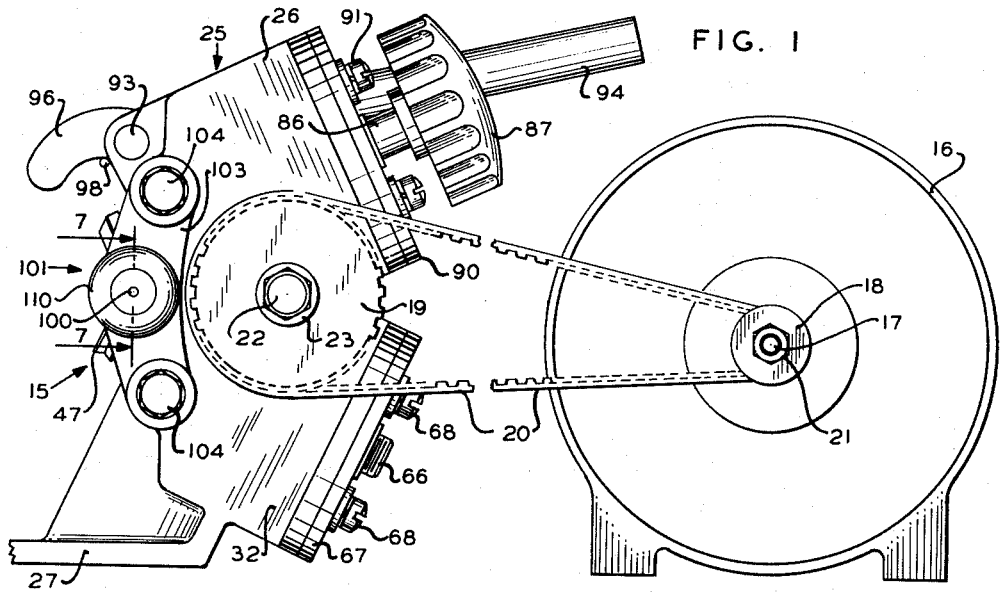
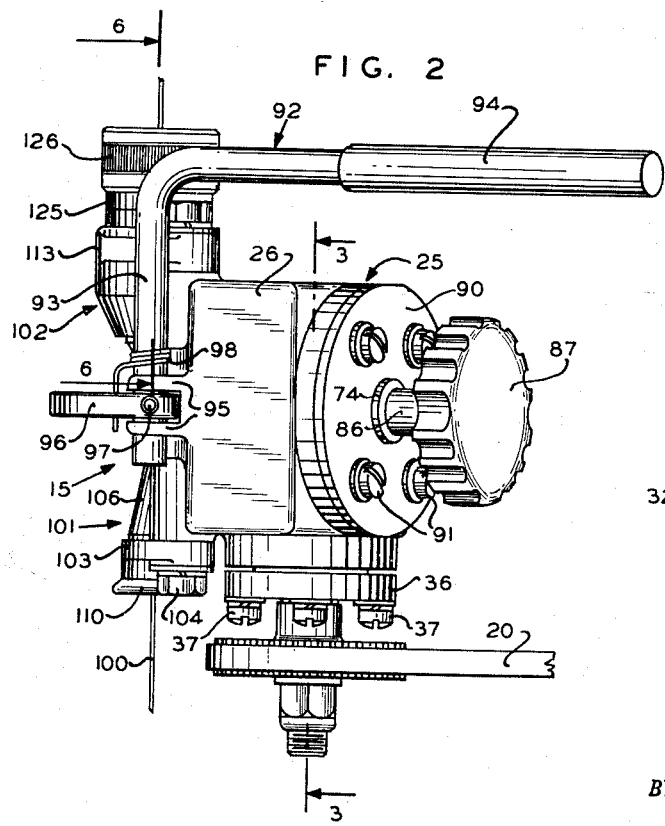
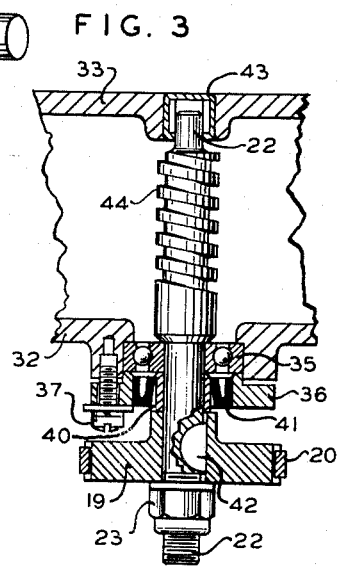
INVENTOR.
LAWRENCE M. LAYDEN
BY H. Hume Mathews
Edmund W. Bopp
ATTORNEY & AGENT

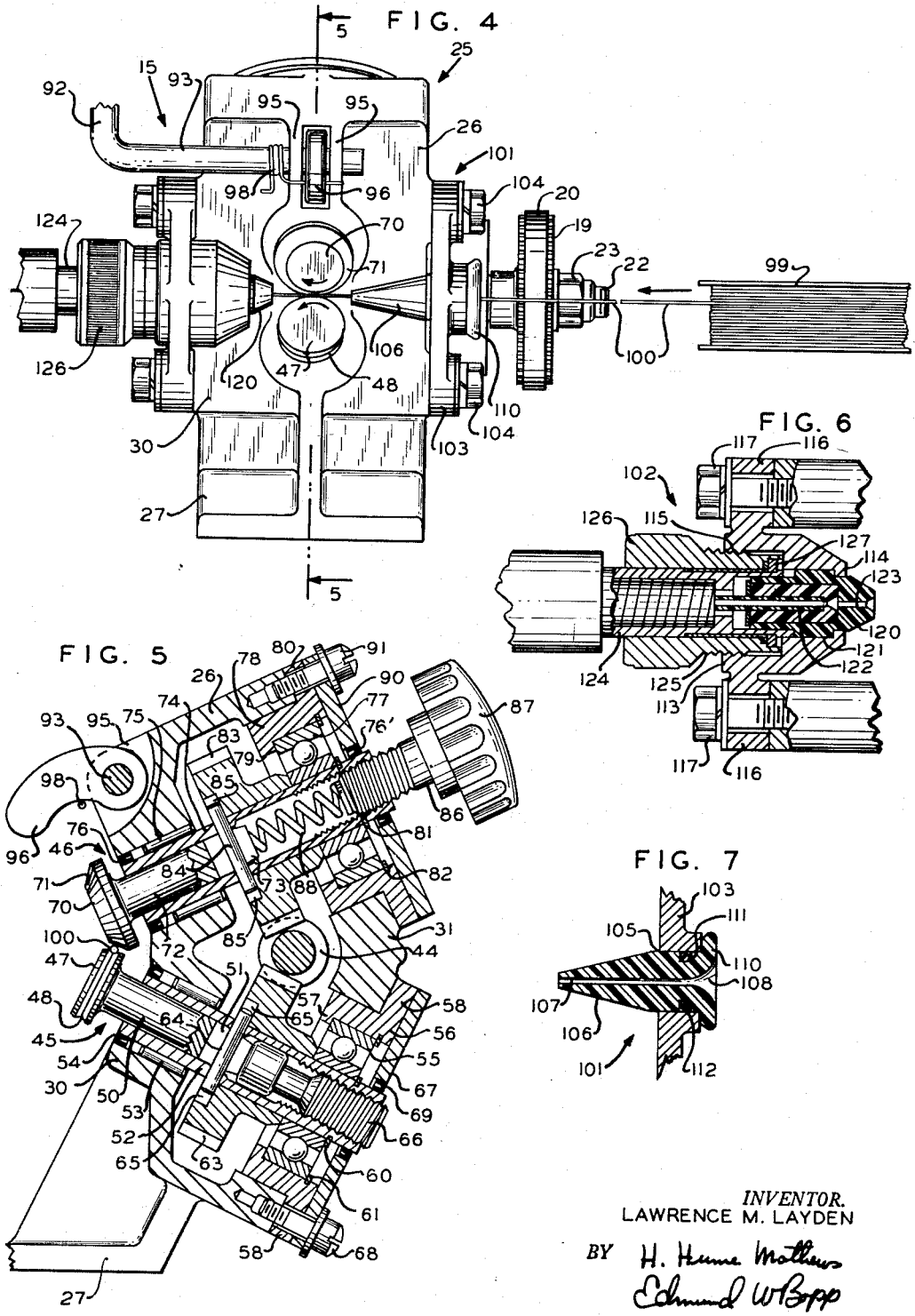

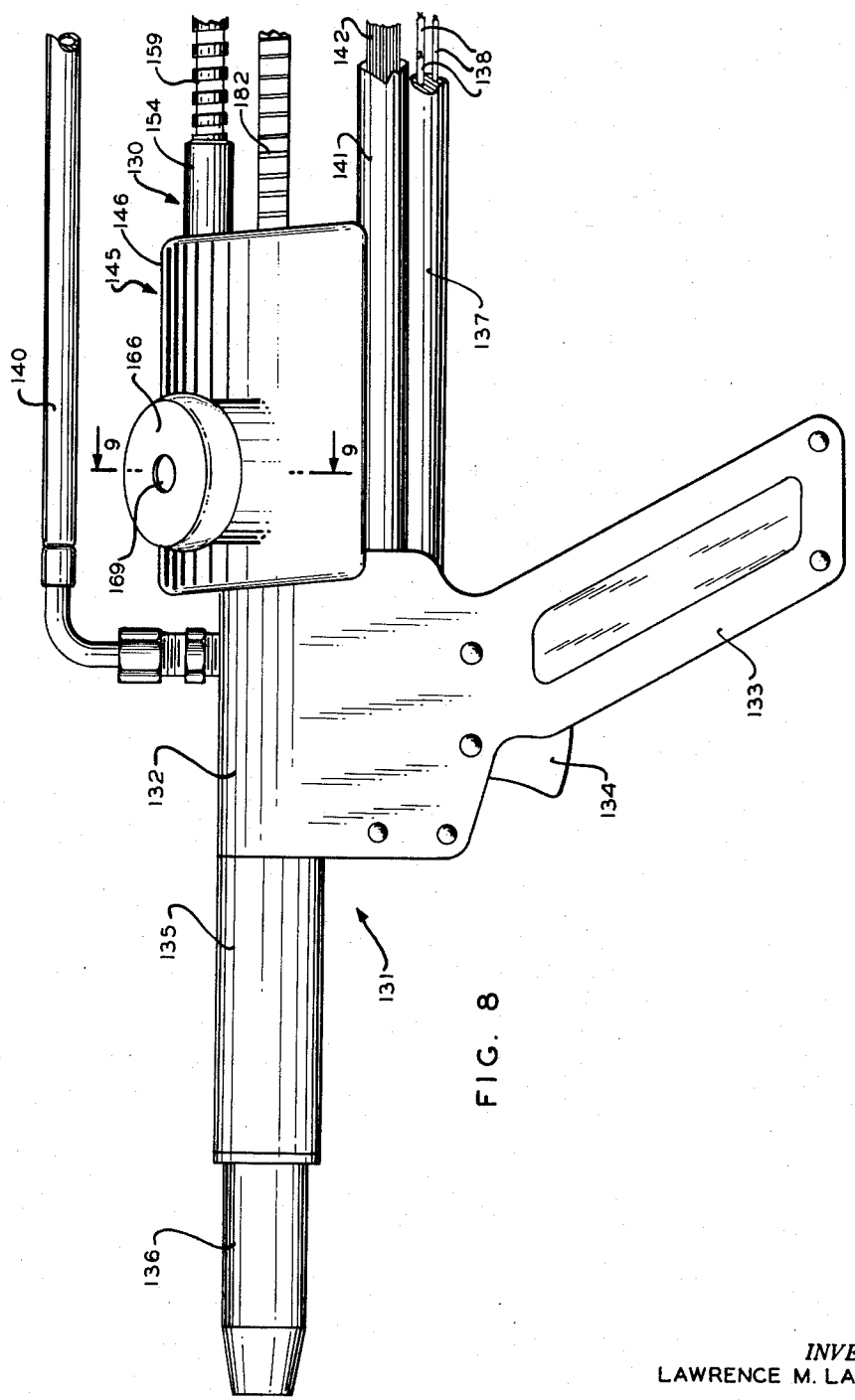

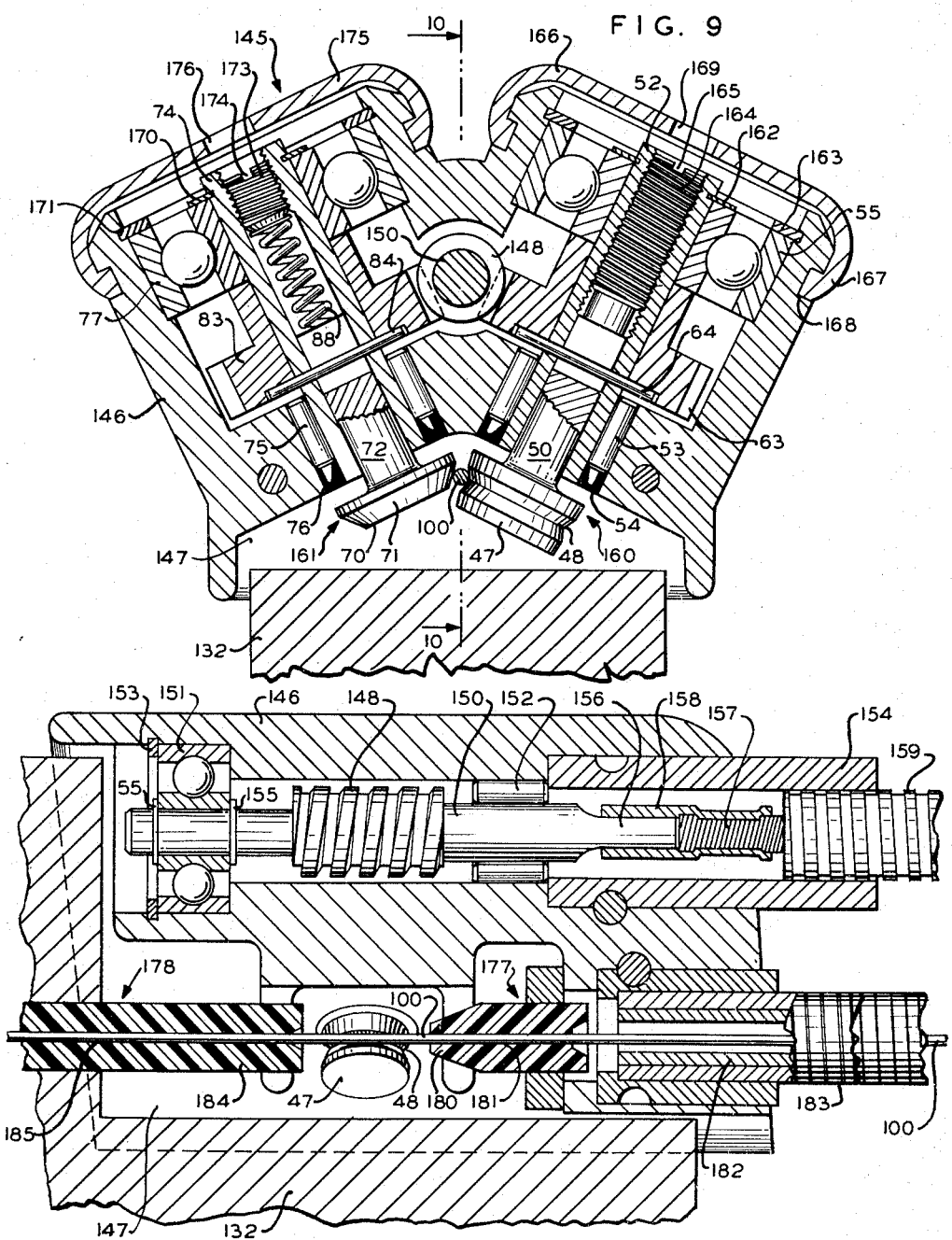

3,009,619
WIRE FEED MECHANISM
Lawrence M. Layden, Basking Ridge, N.J., assignor to Air Reduction Company, Incorporated, New York, N.Y., a corporation of New York
Filed Aug. 5, 1957, Ser. No. 676,064
8 Claims. (Cl. 226—184)

This invention relates to the art of feeding wire and, in one of its more specific aspects, to an improved wire feed mechanism for welding guns and the like.

The wire feed mechanism of this invention has wide application. It is especially useful as a direct or a remote adjunct to a welding gun, such as the type employed in inert-atmosphere arc welding procedures, for the purpose of efficiently feeding a consumable electrode wire of required size and appropriate composition to the welding gun.

While there have been a number of developments in this field in comparatively recent years, none of them has proven entirely satisfactory in use. The following are among the principal objections to presently available wire feed mechanisms.

(1) They are so large, heavy and cumbersome that they cannot be conveniently moved to and/or used at locations where working space is restricted.

(2) Their wire-feed speed ranges are narrow, thereby limiting their use unduly. Difficulty is frequently encountered when such mechanisms are operated at their lowest speeds, especially with wires of relatively large diameter. Moreover, they are incapable of properly and reliably feeding wire at the high rates required by present day high-speed welding techniques.

(3) They have their parts so constructed and arranged that changing from one wire size to another requires the use of tools and is both laborious and time consuming.

(4) They require considerable and costly maintenance. Present day wire feed mechanisms, which employ open gears and shafts mounted on a single bearing, are subject to rapid wear and, as a consequence, require careful periodic lubrication to attain even moderate useful life.

One of the heretofore unsolved problems of the welding industry has been that of properly feeding a fine diameter wire through a length of flexible guide conduit. Experience has demonstrated that it is extremely difficult to push a very fine wire through such a conduit by reason of the fact that the wire tends to receive and retain a permanent set from being spooled. This causes galling and binding of the wire in the course of its movement through the conduit and makes the feeding thereof uncertain and erratic.

Considerable difficulty has also been encountered in the past when feeding fine wires with the aid of known pull type feed mechanisms. This difficulty is attributable principally to the ineffective clamping and driving action of conventional drive rolls on fine wire. Such action often results in excessive wire slippage and non-uniform weld metal deposits. Similarly, variations in the diameter of larger wires tend to encourage slippage thereof, thereby also resulting in non-uniform wire feed rates and fluctuating weld metal deposit.

Conventional drive rolls obtain their wire clamping action from an impressed force which is applied radially with respect to at least one of the roll shafts. This arrangement requires loose or sloppy gearing, which wears rapidly and has to be replaced frequently, with resultant high maintenance costs in material and labor. Furthermore, the gearing and associated parts are heavy and bulky and, as a consequence, the complete mechanism is too heavy and cumbersome for ready transportation from place to place and convenient manipulation at the use site.

The above referred-to objections and difficulties experienced in the past are eliminated by the wire feed mechanism of this invention, as will be evident from the detailed description appearing further along herein.

It is the primary object of this invention to provide an improved and simplified wire feed mechanism having better operational characteristics than corresponding known mechanisms.

Another object of the invention is to provide an improved mechanism for efficiently feeding wire to a welding gun or the like, the mechanism being adapted to readily feed wires of various sizes and within a wide range of speeds, as required.

The invention has for another object the provision of a wire feed mechanism including a pair of drive rolls which are so constructed, arranged and interrelated with other parts that they may be easily and quickly removed, replaced or changed without the use of tools.

A further object of the invention is to provide a wire feed mechanism for welding guns or the like which is compact and lightweight in design, sturdy and durable in construction and efficient and reliable in operation.

A still further object of the invention is to provide a mechanism of the character indicated that is reasonable in manufacturing and operating costs, that is low in maintenance cost and that is capable of performing its intended functions in an entirely satisfactory and trouble-free manner.

To the end that the foregoing objects may be readily attained, a preferred wire feed mechanism of this invention includes a main housing or support having a pair of hollow shafts positioned therein and mounted for rotation about corresponding intersecting axes. The hollow shafts are rotated in unison and in opposite directions through the medium of a driving means which is also positioned in the housing. The driving means comprises a worm and a pair of worm gears, each of which meshes with the worm and is coupled to a corresponding hollow shaft. The worm axis is substantially normal to the common plane of the hollow shaft axes.

The mechanism is provided with cooperating first and second feed rolls. Each roll includes a stem which is axially slidable in and rotatable with a corresponding hollow shaft. The first roll has a substantially circular outer groove and the second roll has a frusto-conical outer face. A helical compression spring is positioned within the hollow shaft of the second roll and normally and yieldingly urges that roll toward the first roll. The loading on the spring is adjustable. The hollow shafts and the rolls are so constructed and arranged that they are normally retained in cooperative relationship. Their configuration and orientation is also such that the rolls are self retaining, i.e., the pressure applied between the roll faces by the helical compression spring acts in a direction to prevent the stem of either roll from working its way out of the respective hollow shaft. This eliminates the need for any other roll retaining means. An actuating means is provided to move the second roll in a direction away from the first roll, against the action of the compression spring, to permit withdrawal of the first roll from its hollow shaft. The second roll may then be withdrawn from its hollow shaft upon release of the actuating means.

The mechanism additionally includes a pair of wire guide means which are mounted on the main housing. Each guide means comprises a guide bushing. One of the guide bushings is disposed to one side of the common plane of the axes of the hollow shafts and the other guide bushing is disposed to the other side of that plane. The guide bushings are aligned axially and serve to maintain the wire that is fed by the mechanism in a rectilinear path as it passes between the feed rolls.

One form of the invention contemplates housing the wire feed mechanism, an electric motor, suitable drive connections between the motor and the worm, and a spool of wire to be fed by the mechanism in a carrying case. The case may be located at a point remote from the welding gun and the wire may be advanced to the gun through a flexible conduit which connects the outlet bushing of the mechanism to the wire guide tube of the gun.

Another form of the invention contemplates mounting the wire feed mechanism directly on the welding gun. Motive power for driving the worm is supplied by a flexible shaft which is connected at one end to the worm and at its other end to an electric motor which may be located at a distance from the gun.

One of the features of the invention is that the frusto-conical smooth faced roll may be used for various size wires. Only the circularly grooved roll need be changed when the mechanism is used to feed a wire having a different diameter from that previously fed. All circularly grooved rolls may have the same outside diameter and differ only in groove depth to accommodate wires of correspondingly different diameters. As a consequence, the center line of the wire is properly and accurately aligned with the wire guide bushings at all times.

Another feature of the invention resides in the fact that it permits the use of small diameter feed rolls for relatively large diameter bearings. This requires less gear reduction since one revolution of a small diameter roll will advance the wire a shorter distance than one revolution of a large diameter roll. Moreover, it is very desirable to use large diameter bearings for the dual reasons that their friction losses are smaller and their designs are less critical.

Another feature of the invention is that it readily achieves desired speed reduction. Initial speed reduction is attained through the use of a timing belt with a large diameter sprocket wheel or pulley connected to the worm and a small diameter sprocket wheel or pulley connected to the motor shaft. Further speed reduction is effected within the housing by proper selection of the worm and its mating worm gears. The gear arrangement may have a ratio of 3 to 1, or greater, if desired.

Another feature of the invention resides in the fact that all gears, bearings and shafts are contained within the main housing. This simplifies lubrication and protects the parts against damage.

The enumerated objects and additional objects, together with the advantages obtainable by the use of the mechanism of this invention, will be readily understood by persons skilled in the art upon reference to the following detailed description taken in conjunction with the annexed drawings, which, respectively, describe and illustrate two related forms of apparatus embodying the invention.

In the drawings, wherein like reference numerals denote corresponding parts throughout the several views:

FIG. 1 is a view in side elevation of one form of wire feed mechanism constructed in accordance with this invention operatively connected to an electric motor for supplying motive power thereto;

FIG. 2 is a top plan view of the wire feed mechanism shown in FIG. 1;

FIG. 3 is a view taken along line 3—3 of FIG. 2, certain parts being omitted for better illustration of other parts;

FIG. 4 is a view in front elevation of the wire feed mechanism shown in FIGS. 1 and 2, as observed from the left of FIG. 1;

FIG. 5 is a view taken along line 5—5 of FIG. 4;

FIG. 6 is a view taken along line 6—6 of FIG. 2 and turned 90 degrees with respect to FIG. 2;

FIG. 7 is a fragmentary detail view taken along line 7—7 of FIG. 1;

FIG. 8 is a side elevation view of a manual welding torch or gun having mounted thereon another form of wire feed mechanism which is constructed in accordance with this invention;

FIG. 9 is a view in enlargement taken along line 9—9 of FIG. 8; and

FIG. 10 is a view taken along line 10—10 of FIG. 9.

Referring initially to FIG. 1 of the drawings, I have illustrated therein a wire feed mechanism which is generally indicated by numeral 15. This mechanism is actuated by an electric motor 16, having a rotary shaft 17, through the intermediary of a drive sprocket wheel 18, a driven sprocket wheel 19 and an open timing belt 20. Sprocket wheel 18 is secured to the motor shaft by a lock nut 21 and is rotatable with that shaft. Sprocket wheel 19 is secured to a worm shaft 22 of mechanism 15 by a lock nut 23 and parts to be described. It is sufficient to state at this time that the arrangement of sprocket wheels 18 and 19 and timing belt 20 effects rotation of worm shaft 22 in response to corresponding rotation of motor shaft 17. Mechanism 15, motor 16 and associated devices are adapted to be mounted in the illustrated relative position in a suitable portable case (not shown) for ready transportation to any desired location of use.

Mechanism 15 comprises a main housing or support 25 which includes a hollow casting 26 and an integral base 27. The housing has a front wall 30 (FIGS. 4 and 5), a rear wall 31 (FIG. 5) and side walls 32 and 33 (FIG. 3). As is shown in FIG. 3, one end of worm shaft 22 is supported for rotation in a ball bearing 35 which is positioned in an opening in housing side wall 32. This bearing is retained in position by a ring type cover plate 36 which is secured to wall 32 by screws 37. A spacer sleeve 40 is coaxial with the worm shaft and is positioned intermediate the ball bearing and driven sprocket wheel 19. A flexible sealing ring 41 is disposed in the annular space defined by cover plate 36 and spacer sleeve 40. This ring retains the lubricant within the housing and excludes dust, dirt or other foreign particles from the ball bearing. Driven sprocket wheel 19 is coupled to the worm shaft by a key 42. The other end of the work shaft is journaled in a hollow bearing 43 which is pressfitted in housing side wall 33. The worm shaft has an integral worm 44 which is positioned between ball bearing 35 and hollow bearing 43.

There is provided a pair of drive roll units 45 and 46, which will now be described. Unit 45 includes a substantially right circular cylindrical roll 47 having a circumferential V-groove 48 formed therein. For reasons to be hereinafter described this roll 47 is preferably made with a slight taper (of the order of 10°) so that the face of the roll, exclusive of the groove, is actually in the form of a frustum of a cone having its base toward the main housing. This roll includes a stem 50 which is bifurcated at its free end, as indicated at 51 in FIG. 5. Stem 50 is slidable in and rotatable with a hollow shaft 52 that is supported at its forward end in a needle type bearing 53 in housing front wall 30. A flexible sealing ring 54 is disposed in the annular space defined by the hollow shaft and the front wall to retain the lubricant within the housing and to protect the needle bearing against foreign matter. The rear end of hollow shaft 52 is rotatable in a ball bearing 55 which is positioned in a tubular bearing housing 56. This bearing housing has an internal circular flange 57 against which the ball bearing rests and an external circular flange 58. A pair of snap-on retaining rings 60 and 61 respectively engage hollow shaft 52 and bearing housing 56, as shown in FIG. 5, and serve to retain the ball bearing in the illustrated position.

Coaxial with hollow shaft 52 is a worm gear 63 which meshes with worm 44. The hollow shaft carries a pin 64 which extends through the bifurcated end 51 of stem 50 and registers with diametrically opposed end slots 65 in worm gear 63. This pin serves as a coupler whereby worm gear 63, hollow shaft 52 and roll 47 are rotated in unison in response to rotation of worm 44. Pin 64 also permits of sliding movement of the roll relative to the hollow shaft. The hollow shaft is internally threaded at its rear end to receive an adjusting screw 66 for limiting the axial position of roll stem 50 within the hollow shaft. A ring type cover plate 67 extends across the outer end of bearing housing 56 and is affixed to the main housing by screws 68 which extend through flange 58. A second flexible sealing ring 69, between hollow shaft 52 and cover plate 67, retains the lubricant within the housing and protects ball bearing 55 against foreign matter.

Drive roll unit 46 includes a drive roll 70 having a frusto-conical outer face 71 and a stem 72 which is bifurcated at its free end, as indicated at 73. As in the case of unit 45, unit 46 is provided with a hollow shaft 74, a needle bearing 75, a flexible sealing ring 76, a ball bearing 77, a tubular bearing housing 78 having flanges 79 and 80, retaining rings 81 and 82, a worm gear 83, and a pin 84 which registers with the bifurcated end of stem 72 and diametrically opposed end slots 85 in worm gear 83. This worm gear also meshes with worm 44 and effects rotation of hollow shaft 74 and roll stem 72 which is axially slidable in hollow shaft 74. Hollow shaft 74 is internally threaded at its rear end to receive an adjusting screw 86 having a knob 87. A helical compressioned spring 88 is positioned within shaft 74 and bears at its ends against roll stem 72 and adjusting screw 86. This spring normally and yieldingly urges roll 70 toward the left, as viewed in FIG. 5. In other words, spring 88 normally biases roll 70 axially in a direction toward roll 47. The frusto-conical face of roll 70 is preferably formed at such an angle that a line perpendicular to the roll face 71 in the plane of the axes of the roll shafts intersects the axis of roll 47 at an acute angle on the side of the perpendicular away from the housing. The purpose of this is to assure the transmittal of a component of force from spring 88 to roll 47, through roll 70, in a direction to urge roll 47 into the hollow shaft 52 to retain roll 47 in place therein. With such an arrangement the rolls are self retaining and no additional retaining means are required. This expedites the removal and replacement of the rolls without the use of tools. To minimize the pressure between rolls to prevent damage when no wire is in the apparatus the angle of the faces of the two rolls 47 and 70 are preferably so related that the rolls make line contact. As has been previously pointed out the line of contact may be of the order of 10° from the axis of roll 47. The loading on spring 88 may be varied, as desired, by turning adjusting screw 86 in a corresponding direction. Unit 46 is also provided with a housing cover plate 90, screws 91 and a flexible sealing ring 76' which is positioned in the annular opening defined by cover plate 90 and hollow shaft 74.

Reference is next had to FIGS. 2, 4 and 5 which illustrate a means for moving roll 70 inwardly or toward the right, as viewed in FIG. 5, against the action of spring 88. This means comprises an L-shaped lever 92 having an arm 93 and a handle 94. Arm 93 is pivotally supported in a pair of spaced lugs 95 which are integral with main housing 25. A cam member 96 is carried by arm 93 and is secured thereto in any desired angular position by a set screw 97. It will be observed from an examination of FIG. 4 that cam member 96 is positioned between lugs 95. A spring 98 is mounted on the lever arm and is so formed and arranged as to normally and yieldingly urge cam member 96 and the lever in a clockwise direction, as viewed in FIGS. 1 and 5, and away from drive roll 70. Upon pivotal movement of the lever in a counterclockwise direction (FIGS. 1 and 5), the free end of cam member 96 engages drive roll 70 and moves it toward the right (FIG. 5), against the action of spring 88.

Wound on a spool 99 (FIG. 4) is a supply of a consumable electrode wire 100 which is adapted to be engaged and fed by rolls 47 and 70 of mechanism 15. The spool is adapted to be mounted for rotation in the portable case referred to earlier herein. Wire 100, as it is unwound from the spool, moves in the direction indicated by the straight arrow in FIG. 4 and passes first through a first wire guide unit 101, next between rolls 47 and 70 and then through a second wire guide unit 102.

Guide unit 101 is best shown in FIGS. 1, 2 and 7 and includes a housing 103 which is secured to main housing side wall 32 by a pair of screws 104. Housing 103 has a central opening 105 (FIG. 7) to receive a wire inlet guide bushing 106. This bushing is preferably made of nylon but may be made of any other suitable synthetic plastic material. Bushing 106 has a central rectilinear passage 107, having a flared entrance end 108 and is formed with a circular flange 110. The bushing also has an annular groove 111 to receive an O-ring 112 which effects retention thereof in housing 103.

Guide unit 102 includes a hollow housing 113 which, as best shown in FIG. 6, is drilled on several diameters and is provided with an internal circular flange 114 and an internally threaded portion 115. Housing 113 is also provided with integral extensions 116 for attachment to the main housing by screws 117. A coaxial, nested arrangement of an outlet guide bushing 120 and sleeves 121 and 122 is located within housing 113. These parts are all preferably made of nylon or other suitable plastic material. Guide bushing 120 has a central passage 123 which communicates with the passage defined in sleeve 122. A flexible guide tube 124 communicates with sleeve 122. A hollow nut 125, having a knurled head 126, is threadedly connected to portion 115 of housing 112 and bears against a sealing ring 127.

For the purpose of outlining the operation of the above described form of the invention, it is assumed that the parts have been assembled and are in the relative position shown in the drawings. With the parts so arranged, wire 100 extends from spool 99 through passage 107 of inlet guide bushing 106, between groove 48 of roll 47 and frusto-conical face 71 of roll 70, through passage 123 of outlet guide bushing 120, through sleeve 122 and through guide tube 124, whence it extends to a welding gun (not shown). Spring 88 biases roll 70 toward the left, as viewed in FIG. 5. This causes the drive rolls to exert an effective clamping action on the portion of wire 100 which is positioned therebetween.

When motor 16 is placed in active service, worm shaft 22 and its worm 44 are rotated through the medium of sprocket wheels 18 and 19 and timing belt 20. Rotation of the worm effects corresponding simultaneous rotation of worm gears 63 and 83, hollow shafts 52 and 74 and rolls 47 and 70 in opposite directions. As indicated by the curved arrows in FIG. 4, roll 47 rotates in a counterclockwise direction while roll 70 rotates in a clockwise direction. The rotation thus imparted to the rolls, unwinds wire 100 from its spool 99, draws the wire through inlet guide bushing 106, and pushes it through outlet guide bushing 120 and thence through flexible guide tube 124. The gripping and clamping action of the rolls on the wire may be readily varied by simply turning knob 87 of adjusting screw 86, thereby correspondingly varying the loading on spring 88.

The rolls are so constructed and arranged that they are normally retained in their hollow shafts. When it is desired to change roll 47 or remove both rolls from the main housing, lever 92 is swung to rotate its arm 93 and cam member 96 in a counter-clockwise direction, as viewed in FIG. 5. This causes the cam member to engage the free end of roll 70 and move that roll axially toward the right and away from roll 47, against the action of spring 88. Roll 47 may then be withdrawn from its hollow shaft. Upon release of lever 92, it will return to its normal position due to the action of its spring 98, allowing roll 70 to be ejected from its hollow shaft. In replacing the rolls, roll 70 is inserted in its hollow shaft and lever 92 is actuated to move and hold this roll to its innermost position with respect to its hollow shaft. Roll 47 is then inserted in its shaft to the extent permitted by adjusting screw 66. Lever 92 is then released, permitting roll 70 to return to the position shown in FIG. 5. It will be appreciated from the foregoing that the rolls may be easily and quickly installed, removed or replaced, as desired, without the use of tools.

Reference is next had to FIGS. 8, 9 and 10 wherein there is illustrated a modified form of wire feed mechanism of this invention, which is generally designated by numeral 130 and which is operatively mounted on a welding torch or gun 131. The welding gun may be of any suitable known type which employs a consumable wire electrode in an electric arc welding procedure, such as that disclosed in G. R. Turbett Patent No. 2,727,970, dated December 20, 1955, and entitled "Gas Shielded Electric Arc Welding Apparatus." The illustrated welding gun comprises a hollow body 132 which terminates in a pistol type grip 133 that carries a trigger 134 for actuating a switch (not shown). Secured to and projecting forwardly of body 132 is a barrel 135 which carries a nozzle 136. A control cable 137 extends rearwardly of the gun body and encases a plurality of electric conductors 138. A conduit 140 communicates with the interior of gun body 132. This conduit is adapted to transmit cooling water or other cooling fluid from a suitable source to the gun. The coolant is exhausted from the gun by way of a flexible conduit 141 which surrounds a multistrand cable 142 by which the welding current is supplied to the gun from the welding generator. Reference may be had to said Turbett patent for further details of construction of the welding gun.

Mechanism 130 is closely similar to earlier described mechanism 15. This comprises a main housing 145 which includes a hollow casting 146 that is mounted on and is firmly secured to welding gun body 132 in any suitable manner known to the art. Casting 146 and gun body 132 define a space 147 (FIGS. 9 and 10). Positioned within the casting is a worm 148 corresponding to worm 44 earlier described. This worm has a shaft 150 which is mounted for rotation in a ball bearing 151 and a needle bearing 152. The ball bearing is retained in the housing by a retaining ring 153. Worm shaft 150 is restrained against axial movement by a pair of snap rings 155 which are disposed to opposite sides of the ball bearing. The worm shaft has a rear end portion of reduced size 156 which is clamped to an end of a flexible shaft 157 by a tubular fitting 158. Shaft 157 is rotatable in a flexible tubular sheath 159 and is adapted to be rotated by an electric motor (not shown) which may be located remote from the welding gun. It will be observed that rotation of shaft 157 imparts like rotation to the worm shaft and the worm.

As in the case of the earlier described form of the invention, mechanism 130 includes a pair of drive roll units 160 and 161 which correspond to drive roll units 45 and 46, respectively. The parts of units 160 and 161 which are the same as those of units 45 and 46 are designated by like numerals.

Drive unit 160 is provided with a first retaining ring 162, which engages hollow shaft 52 and ball bearing 55, and a second retaining ring 163, which engages the casting and the ball bearing. It will be observed that these retaining rings maintain the hollow shaft 52 and ball bearing 55 in the illustrated position. Unit 160 includes an adjusting screw 164 which corresponds to adjusting screw 66 of driving unit 45. This screw has an end slot 165 to receive a screw driver. A cover 166 is disposed across the upper end of unit 160 and is provided with an inwardly projecting lip 167 which registers with an annular groove 168 in the casting. The cover has a central opening 169 to permit ready access to adjusting screw 164.

Unit 161 is provided with a pair of retaining rings 170 and 171 which correspond to rings 162 and 163, respectively, and maintain hollow shaft 74 and ball bearing 77 in the illustrated position. This roll unit utilizes a screw 173, having a screw driver slot 174 in place of screw 86 of unit 46, and is provided with a cover 175, having a central opening 176. This cover is preferably identical with cover 166.

Mechanism 130 additionally comprises a pair of wire guide units 177 and 178 which correspond to earlier described wire guide units 101 and 102, respectively. Guide unit 177 includes an inlet guide bushing 180 which is suitably supported within casting 146, as illustrated. A through passage 181, defined by bushing 180, communicates with a coaxial guide tube 182 and a flexible tube 183 through which wire 100 extends from a source of supply (not shown). Guide unit 178 comprises an outlet guide bushing 184 having a through passage 185 which is axially aligned with passage 181 of the inlet guide bushing. The wire is fed by the roll units into the outlet guide bushing 184 and thence into the welding gun.

The operation of the form of the invention shown in FIGS. 8, 9 and 10 is basically the same as that of mechanism 15. The principal difference is that worm shaft 150 is driven by flexible shaft 157 from a source of motive power remote from the welding gun, instead of by the arrangement of motor 16, sprocket wheels 18 and 19 and timing belt 20 shown in FIG. 1.

From the foregoing, it is believed that the objects, construction, operation and advantages of my present invention will be readily comprehended by persons skilled in the art, without further description. Although the invention has been herein shown and described in several simple and practicable forms, it is recognized that certain parts or elements thereof are representative of other parts or elements which may be used in substantially the same manner to accomplish substantially the same results. Therefore, it is to be understood that the invention is not to be limited to the exact details described herein, but is to be accorded the full scope and protection of the following claims.

I claim:

1. In a mechanism for feeding wire, a support, a pair of rolls carried by said support and rotatable about corresponding axes which intersect one another, said rolls being axially movable in said support and one of said rolls being limited in one direction of axial movement to a fixed position of rotation in said support, resilient means normally and yieldingly urging said other of said rolls axially in a direction toward said one of said rolls to apply pressure between the faces of said rolls, each of said rolls having an outer face adapted to engage and advance a length of wire in response to rotation thereof in opposite directions and said other of said rolls having a conical face which transmits a component of the force of said resilient means through said other of said rolls in a direction to hold said one of said rolls in its fixed position of rotation in said support, and driving means carried by the support for imparting simultaneous rotation in opposite directions to the rolls, said driving means comprising a shaft rotatable about an axis which is substantially normal to the common plane of the roll axes and gear means connected to the shaft and the rolls.

2. In a mechanism for feeding wire, a support, a pair of rolls carried by said support and rotatable about corresponding axes which intersect one another, one of said rolls having a substantially circular groove in its outer face, the other of said rolls having an outer face defined by the surface of revolution of a right circular cone and said rolls being axially movable in said support and being adapted to engage a length of wire between said groove in the outer face of said one of said rolls and said outer face of said other of said roll and advance the wire in response to rotation of said rolls in opposite directions, means for limiting one direction of movement of said one of said rolls in said support to a fixed position of rotation therein, resilient means normally and yieldingly urging said other of said rolls axially in a direction toward said one of said rolls to apply between the faces of said rolls a pressure which is in part directed by said conical surface of said other of said rolls axially of said one of said rolls toward said axial movement limiting means therefor and holds said one of said rolls in its said fixed position of rotation in said support, and driving means carried by the support for imparting simultaneous rotation in opposite directions to the rolls, said driving means comprising a shaft rotatable about an axis which is substantially normal to the common plane of the roll axes and gear means connected to the shaft and the rolls.

3. In a mechanism for feeding wire, a support, first and second hollow shafts carried by said support and rotatable therein about corresponding axes which intersect one another, a first roll having a stem that is disposed lengthwise in the first hollow shaft, a second roll having a stem that is disposed lengthwise in the second hollow shaft, each roll stem being rotatable with and lengthwise slidable relative to its hollow shaft, the first roll having a substantially circular groove in its outer face, the second roll having an outer face defined by the surface of revolution of a right circular cone and said rolls being adapted to engage a length of wire between said groove in the outer face of the first roll and said outer face of the second roll and advance the wire in response to their rotation by their hollow shafts in opposite directions, means within the first hollow shaft and acting on the stem of said first roll for limiting the inward movement of the stem of said first roll into the first hollow shaft, resilient means within the second hollow shaft and acting on the stem of said second roll for normally and yieldingly urging the second roll axially in a direction toward the first roll to apply pressure between the faces of said rolls, and driving means carried by said support for imparting simultaneous rotation to the hollow shafts in opposite directions, said driving means comprising a drive shaft rotatable about an axis which is substantially normal to the common plane of the axes of the hollow shafts and gear means connected to the drive shaft and to the hollow shafts.

4. In a mechanism for feeding wire, a support, a pair of hollow shafts carried by the support and rotatable therein about corresponding intersecting axes, a pair of rolls, each roll having a stem that is disposed in a corresponding hollow shaft and each roll stem being rotatable with and lengthwise slidable in its hollow shaft, means within the first hollow shaft and acting on the stem of said first roll for limiting the inward movement of the stem of said first roll into the first hollow shaft, resilient means within the second hollow shaft and acting on the stem of said second roll for normally and yieldingly urging the second roll axially in a direction toward the first roll to apply pressure between the faces of said rolls, said rolls having outer faces adapted to engage and advance a length of wire in response to their rotation in opposite directions by their said hollow shafts and said second roll having a conical face which transmits a component of force from said resilient means to said first roll in a direction to hold its stem in said first hollow shaft, and driving means carried by the support for imparting simultaneous rotation in opposite directions to the hollow shafts, said driving means comprising a drive shaft rotatable about an axis which is substantially normal to the common plane of the axes of the hollow shafts and gear means connected to the drive shaft and the hollow shafts.

5. In a mechanism for feeding wire, a support, first and second hollow shafts carried by said support and rotatable therein about corresponding axes which intersect one another, a first roll having a stem that is disposed lengthwise in the first hollow shaft, a second roll having a stem that is disposed lengthwise in the second hollow shaft, the first roll having a substantially circular groove in its outer face, the second roll having an outer face defined by the surface of revolution of a right circular cone and said rolls being adapted to engage a length of wire between said groove in the outer face of the first roll and said outer face of the second roll and advance the wire in response to rotation of said rolls in opposite directions, means within the first hollow shaft and acting on the stem of said first roll for limiting the inward movement of the stem of said first roll into its said first hollow shaft, resilient means within the second hollow shaft and acting on the stem of said second roll for normally and yieldingly urging said second roll axially toward said first roll to apply between the faces of said rolls a pressure which by reason of the inclination of said conical surface of said second roll produces on said first roll a force which is in a direction to hold the stem of said first roll in its said hollow shaft, and driving means carried by said support for imparting simultaneous rotation to the hollow shafts in opposite directions, said driving means comprising a drive shaft rotatable about an axis which is substantially normal to the common plane of the axes of the hollow shafts and gear means connected to the drive shaft and to the hollow shafts.

6. In a mechanism for feeding wire, a support, first and second hollow shafts carried by said support and rotatable therein about corresponding axes which intersect one another, a first roll having a stem that is disposed lengthwise in the first hollow shaft, a second roll having a stem that is disposed lengthwise in the second hollow shaft, the first roll having a substantially circular groove in its outer face, the second roll having an outer face defined by the surface of revolution of a right circular cone and said rolls being adapted to engage a length of wire between said groove in the outer face of the first roll and said outer face of the second roll and advance the wire in response to rotation of said rolls in opposite directions, separable coupler means respectively forming for each roll a driving connection between its stem and its said hollow shaft for transmitting rotation of said hollow shaft to said roll, each said coupler means providing for lengthwise sliding movement of each said roll stem in its said hollow shaft and for removal of each said stem from its said hollow shaft, means within the first hollow shaft and acting on the stem of said first roll for limiting the inward movement of the stem of the said first roll into its said first hollow shaft, resilient means within the second hollow shaft and acting on the stem of said second roll for normally and yieldingly urging the second roll axially toward the first roll to apply between the faces of said rolls a pressure which by reason of the inclination of said conical surface of said second roll produces on said first roll a force which is in a direction to hold the stem of said first roll in its said hollow shaft, and driving means carried by said support for imparting simultaneous rotation to the hollow shafts in opposite directions, said driving means comprising a drive shaft rotatable about an axis which is substantially normal to the common plane of the axes of the hollow shafts and gear means connected to the drive shaft and to the hollow shafts.

7. A mechanism according to claim 6 including actuating means secured to the support and engageable with the second roll to move the same axially in a reverse direction against the action of the resilient means.

8. A mechanism according to claim 6, wherein the actuating means comprises a lever pivotal about an axis which is substantially normal to the common plane of the axes of the hollow shafts and a camming member affixed to the lever and engageable with the second roll in response to predetermined pivotal movement of the lever about its axis in one direction.

(References on following page)

References Cited in the file of this patent

UNITED STATES PATENTS

| | | |
|---|---|---|
| 467,098 | Hartness | Jan. 12, 1892 |
| 865,001 | Thompson | Sept. 3, 1907 |
| 2,130,698 | Preston | Sept. 20, 1938 |
| 2,170,673 | Anderson | Aug. 22, 1939 |
| 2,351,111 | Davis | June 13, 1944 |
| 2,583,568 | Heizer | Jan. 29, 1952 |
| 2,590,484 | Youhouse | Mar. 25, 1952 |
| 2,838,953 | Cone | June 17, 1958 |

FOREIGN PATENTS

| | | |
|---|---|---|
| 707,395 | Great Britain | Apr. 14, 1954 |
| 522,648 | France | Apr. 4, 1921 |